United States Patent
Pozdnyakov

(10) Patent No.: US 11,461,945 B2
(45) Date of Patent: Oct. 4, 2022

(54) MULTI-PHASE LABEL PLACEMENT PROCESS FOR RENDERING MAP TILES

(71) Applicant: Mapbox, Inc., San Francisco, CA (US)

(72) Inventor: Mikhail Pozdnyakov, Helsinki (FI)

(73) Assignee: Mapbox, Inc., Washington, DC (US)

( * ) Notice: Subject to any disclaimer, the term of this patent is extended or adjusted under 35 U.S.C. 154(b) by 9 days.

(21) Appl. No.: 17/135,195

(22) Filed: Dec. 28, 2020

(65) Prior Publication Data
US 2022/0207800 A1    Jun. 30, 2022

(51) Int. Cl.
  *G06T 11/60*     (2006.01)
  *G09B 29/00*     (2006.01)
  *G06T 3/40*      (2006.01)

(52) U.S. Cl.
  CPC ............ *G06T 11/60* (2013.01); *G06T 3/4038* (2013.01); *G09B 29/003* (2013.01); *G06T 2210/21* (2013.01)

(58) Field of Classification Search
  CPC ... G06T 11/60; G06T 3/4038; G06T 2210/21; G09B 29/003
  See application file for complete search history.

(56) References Cited

U.S. PATENT DOCUMENTS

| | | | |
|---|---|---|---|
| 2005/0270311 A1* | 12/2005 | Rasmussen | G06T 11/40 345/677 |
| 2010/0026718 A1* | 2/2010 | Jetha | G06F 3/0481 715/833 |
| 2012/0050285 A1* | 3/2012 | Kannenberg | G09B 29/10 345/419 |
| 2013/0328915 A1* | 12/2013 | Arikan | G01C 21/32 345/619 |
| 2014/0354629 A1* | 12/2014 | Adlers | G01C 21/3635 345/419 |
| 2015/0262398 A1* | 9/2015 | Iskander | G09G 5/14 345/420 |
| 2018/0107346 A1* | 4/2018 | Wilson | G06F 16/29 |

* cited by examiner

*Primary Examiner* — YuJang Tswei
(74) *Attorney, Agent, or Firm* — Fenwick & West LLP

(57) ABSTRACT

A mapping system prevents mismatching placement of map labels between adjacent map tiles for rendering digital maps. In particular, the mapping system performs a label placement process that considers labels of a map tile shared with adjacent map tiles in order to prevent labels that intersect the map tile and the adjacent map tiles having mismatching placements. During the label placement process, the mapping system performs a first placement phase to place shared labels of a map tile according to label placement constraints. Based on the first phase, the mapping system identifies intersecting labels that can be successfully placed. Using the successfully placed intersecting labels, the mapping system performs a second label placement phase. In particular, the mapping system first places the successfully placed set of intersecting labels, and subsequently places non-intersecting labels for the map tile according to the label placement constraints.

20 Claims, 10 Drawing Sheets

MULTI-PHASE LABEL PLACEMENT PROCESS FOR RENDERING MAP TILES

FIELD OF ART

This description relates to rendering digital maps, and particularly to preventing mismatching map labels on rendered digital maps.

BACKGROUND

Digital electronic maps are widely used today for navigation, ride sharing, and video games, among other uses. While stand-alone map applications often include many of these functionalities, other applications can make use of electronic maps by communicating with a mapping system (e.g., a server), such as through an Application Programming Interface (API).

Some conventional mapping systems render digital maps by stitching together map tiles each depicting a portion of a digital map at a particular scale. Each map tile may be associated with a set of map labels (e.g., icons or symbols) that can be displayed within the relevant map tile when rendered. In order to account for rendering map tiles at a variety of different scales or resolutions, conventional map applications may dynamically place map labels on map tiles at render time to ensure relevant map labels are placed or to avoid conflicting placement of map labels within a rendered map tile.

However, conventional systems place map labels on map tiles in isolation without considering labels that overlap with adjacent map tiles. This isolated placement of map labels results in mismatching placement of map labels on adjacent map tiles when the adjacent map tiles are stitched together for rendering. Conventional systems thus provide digital maps with occasionally mismatching label placement for display to users, resulting in confusing, unintelligible, error-prone, or otherwise negatively impacted user experiences. As such, improved systems for rendering digital maps are needed.

SUMMARY

A mapping system prevents mismatching placement of map labels between adjacent map tiles used for rendering digital maps. The mapping system places labels (e.g., labels, icons, images, etc.) associated with map tiles on the map tiles according to label placement constraints that prevent conflicts between placed labels (e.g., overlapping labels). For example, each label may be placed relative to an anchor position corresponding to the label. In order to prevent labels that intersect a tile border within an overlapping zone between adjacent map tiles having mismatching placements, the mapping system performs a multi-phase label placement process that considers labels shared between adjacent map tiles.

In some embodiments, the multi-phase label placement process includes a first label placement phase and a second label placement phase. During the first label placement phase, the mapping system places labels of a map tile shared with adjacent map tiles according to the label placement constraints. The mapping system evaluates the results of the first label placement phase in order to identify a set of labels intersecting a tile border between the map tile and an adjacent map tile that could be successfully placed. Using the successfully placed set of intersecting labels, the mapping system performs the second label placement phase. In particular, the mapping system first places the successfully placed set of intersecting labels for the map tile. After placing the set of intersecting labels, the mapping system places non-intersecting labels for the map tile according to the label placement constraints. After performing the multi-phase label placement process, the mapping system may render the map tile with placed labels (e.g., as an image) for combing with rendered adjacent map tiles to generate a digital map, e.g., for display on a client device.

In some embodiments, the mapping system identifies a first map tile representing a first portion of a geographic region, the first map tile associated with a set of labels. The mapping system identifies one or more shared labels of the set of shared labels, the one or more shared labels shared with a second map tile representing a second portion of the geographic region overlapping with the first portion. The mapping system applies label placement constraints to the one or more shared labels to identify a set of intersecting labels that can be successfully placed on the first map tile, the intersecting labels intersecting a tile border of the first map tile. After placing the set of intersecting labels on the first map tile, the mapping system applies the label placement constraints to the set of labels to identify a set of non-intersecting labels that can be successfully placed on the first map tile. After placing the set of non-intersecting labels on the first map tile, the mapping system renders the first map tile using the placed sets of intersecting and non-intersecting labels.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

I. System Environment & Architecture

Figure 1:
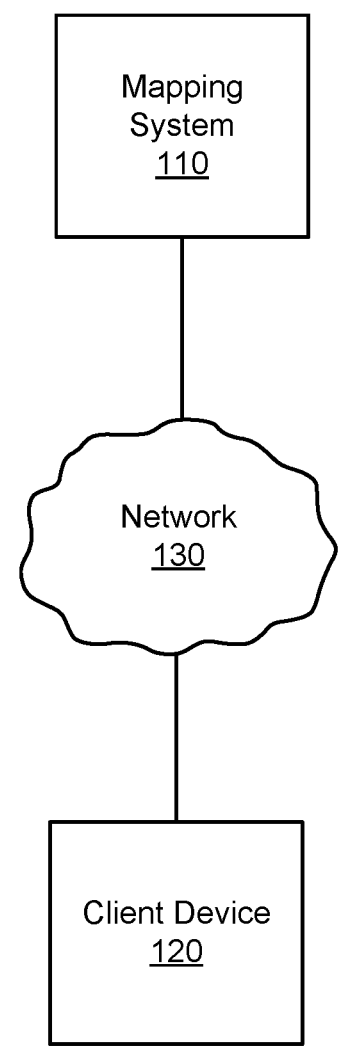
FIG. 1 illustrates a computer environment in which the techniques described may be practiced, according to one embodiment.

FIG. 1 illustrates an embodiment of a computer environment 100 in which the techniques described may be practiced. In the embodiment shown, the computing environment 100 includes a mapping system 110 that provides mapping services and a client device 120 that communicates with the mapping system 110 to receive map data via a network 130. In different embodiments, the computing environment 100 and its components may include different or additional elements than those illustrated in FIGS. 1-2. Furthermore, the functionality may be distributed among the elements in a different manner than described. The computer environment 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. The components of FIG. 1 are now described in more detail.

The mapping system 110 provides mapping services to client devices. In embodiments, the mapping system 110 provides map data to client devices for a variety of purposes, such as to display digital maps for purposes of navigation, ride sharing, or video games (e.g., a mixed reality game). In particular, the mapping system 110 renders map tiles representing respective geographic region that can be used to render digital maps at various scales or resolutions, such as by stitching together the set of rendered map tiles. The map tiles are rendered from corresponding vector data that can be used to dynamically render the map tile. The vector data of the map tiles include geometric information representing geographic features of a geographic region (e.g., roads, terrain, buildings, etc.) and metadata including associated labels describing characteristics of the geographic region, such as the geographic features. The labels may include text (e.g., geographic features names), symbols or icons (e.g., symbols for different types of geographic features), or any other suitable visual indicator of a map tile characteristic. The mapping system 110 processes the geographic information and labels of a map tile to render the map tile in a static format representing the map tile (e.g., as a JPEG, PNG, or other image file formats) that can be combined with other rendered map tiles to render an overall digital map. The static format of the rendered map tiles may be various image formats, such as JPEG, PNG, or any other image format usable to represent a rendered map tile. By rendering individual map tiles representing portions of an overall digital map, as opposed to rendering the entire digital map altogether, the mapping system 110 provides for efficient rendering of digital maps that can dynamically adapt to various scenarios (e.g., map scales). As described in greater detail below with reference to FIGS. 2 and 4A-E, the mapping system 110 performs a label placement process that prevents mismatching placement of map labels intersecting borders between adjacent map tiles. After rendering a map tile, the mapping system 110 may provide the rendered map tile rendering a digital map, e.g., on the client device 120. The mapping system 110 may be comprised of any computing device, including but not limited to: servers, racks, workstations, personal computers, general purpose computers, laptops, Internet appliances, wireless devices, wired devices, multi-processor systems, mini-computers, virtual computing instances, and the like. Although FIG. 1 shows a single element, the mapping system 110 broadly represents one or multiple computing devices, such as a server cluster, which may be located in one or more physical locations.

The client device 120 communicates with the mapping system 110 in order to receive map data. The client device 120 may use the map data for a variety of purposes, such as displaying a digital map or providing navigation services. In embodiments the client device 120 requests a set of rendered map tiles from the mapping system 110 for rendering a digital map on a display of the client device. For instance, the client device 120 may request a set of rendered map tiles for rendering a digital map representing a particular geographic region at one or more scales or resolutions. In this case, the client device 120 may receive the set of rendered map tile from the mapping system 110 and stitch together the set of rendered map tiles to render the digital map. The client device 120 may be any suitable computing device, such as a laptop computer, hand-held computer, wearable computer, cellular or mobile phone, portable digital assistant (PDA), or tablet computer. Although a single client device is depicted in FIG. 1, any number of client devices may be present. The client device 120 may include a GPS receiver that receives signals describing a geographic position of the client device 120 from GPS satellites (e.g., longitude and latitude).

In some embodiments, the client device 120 executes a client map application associated with mapping system 110, such as software that displays, uses, supports, or otherwise provides electronic mapping functionality as part of the application or software. The client map application may be configured for a variety of functions involving map data, such as navigation, transportation, augmented reality, product delivery, etc. In one embodiment, the client map application obtains electronic mapping functions through an integrated software development kit (SDK) or an application programming interface (API) associated with the mapping system 110. In this case, the SDK or API which may implement functional calls, callbacks, methods or other programmatic means for contacting the server computer to obtain map tiles, map tile labels, layer data, or other data that can form the basis of visually rendering a map as part of the application. As an example, client map application may identify a set of map tiles needed to render a particular geographic region (e.g., defined by a set of geographic coordinates) and request corresponding rendered map tiles from the mapping system 110.

The network 130 connects the mapping system 110 and the client device 120. The network 130 may be any suitable communications network for data transmission. In an embodiment such as that illustrated in FIG. 1, the network 130 uses standard communications technologies or protocols and can include the internet. In another embodiment, the entities use custom or dedicated data communications technologies.

II. Exemplary Mapping System

Figure 2:
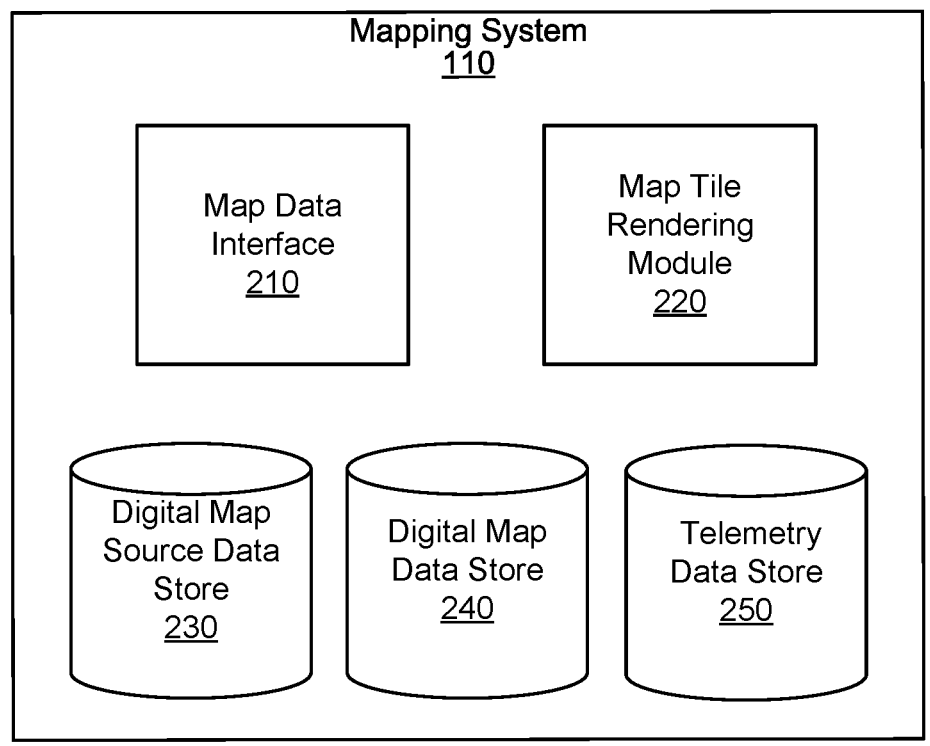
FIG. 2 is a block diagram illustrating a mapping system, according to one embodiment.

FIG. 2 is a block diagram illustrating an embodiment of the mapping system 110. In the embodiment shown, the mapping system 110 includes a map data interface 210 that communicates with external systems or devices (e.g., the client device 120) to provide mapping services and a map tile rendering module 220 that render digital maps, e.g., for display on the client device 120. The mapping system 110 further includes a digital map source data store 230 that stores raw digital map source data, a digital map data store 240 storing digital map data (e.g., derived from the digital map source data), and a telemetry data store 250 storing telemetry data. The components of FIG. 2 are now described in more detail.

The map data interface 210 provides map data services to one or more computing systems (e.g., the client device 120). In particular, the map data interface 210 receives requests for map data describing a geographic region, such as requests for a set of rendered map tiles that can be used to render a digital map representing the geographic region at one or more scales or resolutions (e.g., by stitching together the set of rendered map tiles). In this case, the map data interface 210 may request rendered map tiles from the map tile rendering module 220 corresponding to the geographic region. Responsive to receiving the requested rendered map tiles from the map tile rendering module 220, the map data interface 210 may provide the rendered map tiles to a requesting system or device. The map data interface 210 may receive a request for map data from various sources, such as another component of the mapping system 110 or from a map application on the client device 120. The map data interface 210 may provide various interfaces to facilitate communication between the mapping system 110 and other computing systems, such as user interfaces, application programming interfaces (APIs), Software Development Kits (SDKs), and any other suitable interface.

The map tile rendering module 220 renders map tiles that can be used to render digital maps at a variety of scales or resolutions. For instance, the map tile rendering module 220 may render a set of map tiles for rendering a digital map representing a particular geographic region responsive to a request from the map data interface 210. The map tiles rendered by the map tile rendering module 220 share labels with adjacent map tiles (i.e., shared labels). In some embodiments, map tiles have a perimeter buffer that defines an area extending beyond a visible area of a map tile and includes labels of adjacent map tiles that overlap with the perimeter buffer. The labels of the map tiles correspond to a respective anchor position indicating a position on a map tile relative to which the labels can be placed. For instance, the anchor position corresponding to a label may be the location of a geographic feature associated with the label (e.g., a road or building that the label describes). During placement, the map tile rendering module 220 places a label at an offset position relative to its corresponding anchor position. A label may have multiple possible offset positions relative to the corresponding anchor position, such as an offset position on each side of the anchor position. In some cases, an offset position for a label is the anchor position. Labels of a map tile with an anchor position inside the perimeter buffer of the map tile or inside the perimeter buffer of an adjacent map tile are shared labels. For instance, if a perimeter buffer is defined by a buffer width value, a label may be identified as a shared label if it has an anchor position that is within the buffer width of either side of the visible tile area. Between adjacent map tiles (e.g., when stitched together) is a tile border delineating the respective visible tile areas of the adjacent map tiles. Exemplary map tiles are described in greater detail below with reference to FIGS. 3A-B.

In embodiments, the map tile rendering module 220 applies label placement constraints in order to place labels of a map tile. The label placement constraints may define a variety of rules for preventing overlap between labels during label placement, such as a placement priority for labels of different types (e.g., country names, city names, location names, street names, etc.), a permitted proximity between labels (e.g., a minimum pixel-wise distance between labels), or any other rules for preventing label conflicts during label placement. For example, the label placement constraints may assign labels for city names a relatively high priority while assigning street names a relatively low priority, e.g., so that the labels are displayed without overlap or overcrowding. In some embodiments, labels may be grouped into label sets or layers that include labels having the same placement priority. In this case, the map tile rendering module 220 may place labels by iterating through the sets or label layers. During label placement, the map tile rendering module 220 determines which labels to place on a map tile according to the label placement constraints. For instance, the map tile rendering module 220 may apply an offset position or a placement priority for a label to the feature placement constraints to determine whether the label can be placed at the offset position. In some cases, a label may have multiple possible positions where it can be placed, such as offset positions on multiple sides of the respective anchor position. If a label can be placed at more than one possible position, the map tile rendering module 220 may further determine which position to use to place the label. For instance, if one offset position would result in a label conflicting with a higher priority label (e.g., overlapping the higher priority labels), the map tile rendering module 220 may select a different offset position for the label that does not result in overlap with the higher priority label. As described above with reference to the mapping system 110, the map tile rendering module 220 specifically performs a label placement process that prevents mismatching placement of map labels intersecting a tile border between adjacent vector tiles. In contrast, conventional systems perform label placement that result in mismatching placement of map labels that intersect render-time tiles borders, as described in greater detail below with reference to FIG. 4A.

In some embodiments, the map tile rendering module 220 performs a multi-phase label placement process to place labels of a map tile including a first label placement phase and a second label placement phase. During the first label placement phase, the map tile rendering module 220 identifies a set of shared labels that intersect a border between the map tile and adjacent map tiles that can be successfully placed according to the label placement constraints. In one embodiment, the map tile rendering module 220 preliminarily attempts to place all of the shared labels for a map tile using the label placement constraints during the first label placement phase. In order to ensure that the map tile rendering module 220 attempts to place the shared labels for adjacent map tiles in the same order, the map tile rendering module 220 may sort the shared labels before attempting to preliminarily place them. For example, the map tile rendering module 220 may sort the shared labels by label placement priority (e.g., for labels with different priorities) and by position (e.g., for labels with the same priorities). Among other benefits, by sorting the shared labels the map tile rendering module 220 avoids different placement of map labels with the same label placement priority for adjacent map tiles, such as if map labels with the same placement priorities may otherwise be placed arbitrarily for each individual map tile. After preliminarily placing all of the shared labels that can be successfully placed, the map tile rendering module 220 identifies the successfully placed shared labels that intersect a tile border of the map tile and groups these labels into a set of successfully placed intersecting labels. For instance, the map tile rendering module 220 may identify labels with a bounding box defined around the label that as placed (e.g., at an offset position) overlaps with both sides of a tile border of the map tile. The map tile rendering module 220 then resets a placement state for the map tile (e.g., removes the placed shared labels) in order to perform the second label placement phase using the set of successfully placed intersecting labels. During the second label placement phase, the map tile rendering module 220 first places the set of successfully placed intersecting labels for the map tile. After placing the set of successfully placed intersecting labels, the map tile rendering module 220 attempts to place the non-intersecting labels for the map tile according to the label placement constraints, e.g., the non-shared labels and the non-intersecting shared labels. By placing the successfully placed intersecting labels first, the map tile rendering module 220 ensures intersecting labels are placed at the same positions for adjacent map tiles and therefore prevents mismatching labels between adjacent map tiles. Embodiments of a multi-phase label placement process including a first and second label placement phase are described in greater detail below with reference to FIGS. 4A-D.

In an embodiment where labels of a map tile correspond to multiple possible placement positions (e.g., multiple offset positions), the map tile rendering module 220 attempts to place each label during the first placement process using only a single position for each label (e.g., a default offset position, such as the offset anchor position in an ordered list of possible offset positions). In doing so, the map tile rendering module 220 ensures consistency between placement of intersecting labels for adjacent map tiles that are successfully placed during the first label placement phase and subsequently placed again during the second label placement phase. For instance, the map tile rendering module 220 will not attempt to place an intersecting map label using a first position on one map tile based on the label placement constraints, and then attempt to place the map label at another position on an adjacent map tile based on the label placement constraints.

In some embodiments, the map tile rendering module 220 identifies labels intersecting a tile border between adjacent map tiles that could not be successfully placed during the first label placement phase and groups these labels into a set of unsuccessfully placed intersecting labels. For example, labels intersecting a tile border may not be successfully placed due to conflicts with the placement of higher priority shared labels. In this case, the map tile rendering module 220 does not attempt to place the set of unsuccessfully placed intersecting labels when placing the non-intersecting labels during the second label placement phase. As such, among other benefits, by identifying the set of unsuccessfully placed intersecting labels the map tile rendering module 220 avoids attempting to place intersecting labels during the second phase of the label placement process that cannot be successfully placed. Further, the computational complexity of the multi-step placement process can be reduced, e.g., by eliminating redundant attempts to place intersecting labels that cannot be successfully placed.

Furthermore, in the same or different embodiments, the map tile rendering module 220 reattempts placing some or all of the set of unsuccessfully placed intersecting labels, such as by doing the re-attempt after all other labels for a map tile that can be successfully placed have been placed. In particular, the map tile rendering module 220 may attempt to place labels in the set of unsuccessfully placed intersecting labels that can be placed at multiple possible positions. For instance, if the map tile rendering module 220 only uses a single offset position to attempt to place shared map labels during the first label placement phase, the map tile rendering module 220 may attempt to place unsuccessfully placed intersecting labels at other positions during the second feature placement phase. In an embodiment, the map tile rendering module 220 reattempts placement of unsuccessfully placed intersecting features using offset positions that do not result in the labels intersecting the tile border if placed. Reattempting placement of unsuccessfully placed intersecting labels is described in greater detail below with reference to FIG. 4D.

In some embodiments, the map tile rendering module 220 adjusts (e.g., increases) the size of the perimeter buffer for map tiles in order to prevent higher priority non-shared labels being displaced by earlier placed lower priority intersecting labels during the second label placement phase. In particular, increasing the size of the perimeter buffer can increase the number of shared labels for a map tile, e.g., if the anchor positions corresponding to these labels are within a threshold distance of a tile border derived from the larger perimeter buffer. As such, the map tile rendering module 220 will consider a larger number of shared labels during the first label placement phase, including labels with higher priorities than lower priority intersecting labels that might have otherwise been displaced. As an example of adjusting the perimeter buffer size, a value indicative of the size of the perimeter buffer (e.g., a perimeter buffer width) may be manually adjusted, such as by an administrator of the mapping system 110 or of a client map application on the client device 120. Alternatively, or additionally, the map tile rendering module 220 may dynamically adjust the perimeter buffer size, such as automatically adjusting the value for digital maps representing a particular geographic region or a particular set of map tiles. As an example, the map tile rendering module 220 may track a number of higher priority labels displaced by lower priority labels during rendering of a digital map. If the number of displaced high priority labels exceeds a threshold number, the map tile rendering module 220 may automatically adjust the buffer size. For example, the map tile rendering module 220 may increase the buffer size by a predetermined amount (e.g., five percent of the total width of the tile), or may increase the buffer size by a variable amount, such in proportion to the number of displaced high priority labels. In another embodiment, the map tile rendering module 220 may generate a new set of map tiles with adjusted buffer sizes if the number of high priority labels exceeds a threshold number. In other embodiments, the map tile rendering module 220 may perform adjustments of other characteristics of map tiles in order to prevent displacement of higher priority labels.

The digital map source data store 230 stores raw digital map data that is obtained, downloaded or received from a variety of sources. The raw digital map data may include satellite images, digital street data, building data, place data or terrain data. Example sources include National Aeronautics and Space Administration (NASA), United States Geological Survey (USGS), and DigitalGlobe. The digital map source data store 230 may be updated at any suitable interval, and may be stored for any amount of time. Once obtained or received, raw digital map source data stored in the digital map source data store 230 can be used by the mapping system 110 to generate digital map data (e.g., stored in the digital map data store 240).

The digital map data store 240 stores digital map data including map tiles. The digital map data may be derived from digital map source data, e.g., stored in the digital map source data store 230. In embodiments, the mapping system 110 processes and organizes digital map source data as a plurality of map tiles with corresponding sets of map labels or other style data used to impose different display styles for rendering the map tiles. Digital map data stored in the digital map data store 240 may be updated at any suitable interval, and may include additional information beyond that derived from digital map source data in the data store 230. For example, using aggregated telemetry data stored in the telemetry data store 250, discussed below, various additional information may be stored in association with the map tiles, such as traffic patterns, turn restrictions, detours, common or popular routes, speed limits, new streets, and any other information related to digital maps or the use of digital maps.

The telemetry data store 250 stores digital telemetry data that is obtained or received from mobile computing devices via function calls that are included in a Software Development Kit (SDK) that application developers use to integrate and include electronic maps in applications. The telemetry data may include mobile device location information based on GPS signals. For example, telemetry data may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and/or timestamp. The telemetry data store 250 may store aggregated telemetry data that has been processed using user privacy-preserving operations such as anonymization or chunking, data-cleaning operations such as filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be stored as a trip from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data can be stored in association with one or more map tiles, e.g., stored in the digital map data store 240. Aggregated telemetry data may be stored for any amount of time, such as a day, a week, or more. Aggregated telemetry data may be further processed or used by various applications or functions as needed.

The data stores 230, 240, or 250 may span multiple devices located in one or more physical locations. For example, the data stores 230, 240, or 250 may include one or more nodes located at one or more data warehouses. Furthermore, although the data stores 230, 240, and 250 are depicted in FIG. 1 as components of the mapping system 110, the data stores 230, 240, or 250 may be located on a separate device or devices from the mapping system 110.

III. Rendering Digital Maps without Mismatching Labels

FIGS. 3A-B and 4A-D illustrate embodiments of map tiles with labels placed on the map tiles. In the embodiments shown, the map tiles depict geographic regions (in particular, portions of the city of San Francisco) at a particular map scale or resolution. FIGS. 3B and 4A-D also depict respective labels placed for rendering the map tiles (e.g., stitching adjacent map tiles together into an overall digital map). As depicted in FIGS. 3B and 4A-D, the labels include labels for locations (e.g., "San Francisco"), street names (e.g. "Broadway"), and points of interest (e.g., "Transamerica Pyramid Center"). In contexts or embodiments other than that depicted in FIGS. 3 and 4A-D, labels associated with the adjacent map tiles include other labels, such as symbols to represent highway markers, categories of points of interest, geographic labels, pinned locations, etc. Although only two map tiles are depicted in FIG. 3B and FIGS. 4A-D, a digital map may be rendered using any number of map tiles. For example, the map tiles may be rendered with additional adjacent map tiles above, below, left, right, or diagonal to the map tiles. In particular, if map tiles are represented as squares (as in FIGS. 3A-B and 4A-D), each map tile may be adjacent to up to eight map tiles (i.e., a map tile on each of the four sides and each of the four diagonals). In other embodiments, map tiles may be represented using other shapes (e.g., rectangles, squares, hexagons, etc.). One skilled in the art will appreciate that parallel processes as those described herein can be applied to any possible number of adjacent map tiles or adjacent map tiles having a variety of shapes.

Figure 3A:
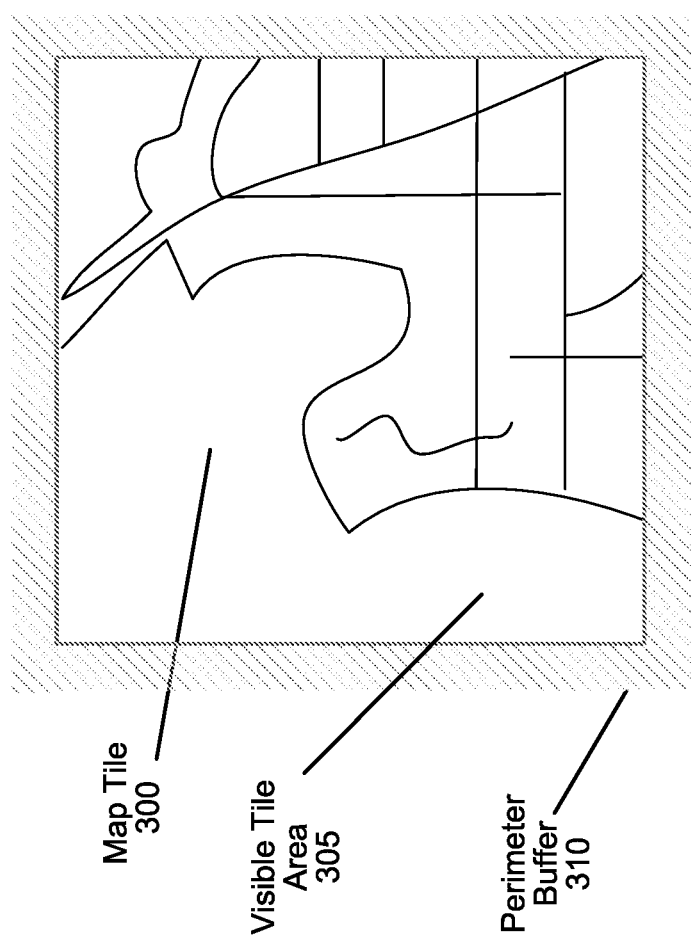
FIG. 3A illustrates a map tile representing a geographic region, according to an embodiment.

FIG. 3A illustrates an embodiment of a map tile 300 representing a geographic region. In the embodiment shown, the map tile 300 includes a visible tile area 305 and a perimeter buffer 310. The visible tile area 305 is rendered with geographic information corresponding to the geographic region represented by the map tile 300. In particular, the visible tile area depicts geographic information representing a coastline, land, roads, ocean, and other geographic labels. After the map tile 300 is rendered as part of an overall digital map, the geographic information within the visible tile area 305 and any labels placed within the visible tile area are rendered (e.g., for display on a user interface). Placement of labels on the map tile 300 is described in greater detail below with reference to FIG. 3B. The perimeter buffer 310 defines an area extending beyond the visible tile area 305. In particular, the perimeter buffer 310 overlaps with the visible tile areas of other map tiles that are adjacent to the map tile 300. For instance, the other map tiles and the map tile 300 may be included in the same set of map tiles, such as a set of map tiles representing a larger overall geographic region. As described below with reference to FIG. 3B, the map tile 300 is associated with a set of labels that may include non-shared labels corresponding to anchor positions within the visible tile area 305 or shared labels corresponding to anchor positions within the perimeter buffer 310. Although the perimeter buffer 310 is depicted using diagonal hash marks, this is done for the purposes of illustration and the perimeter buffer 310 may not be visible on the map tile 300 when rendered.

Figure 3B:
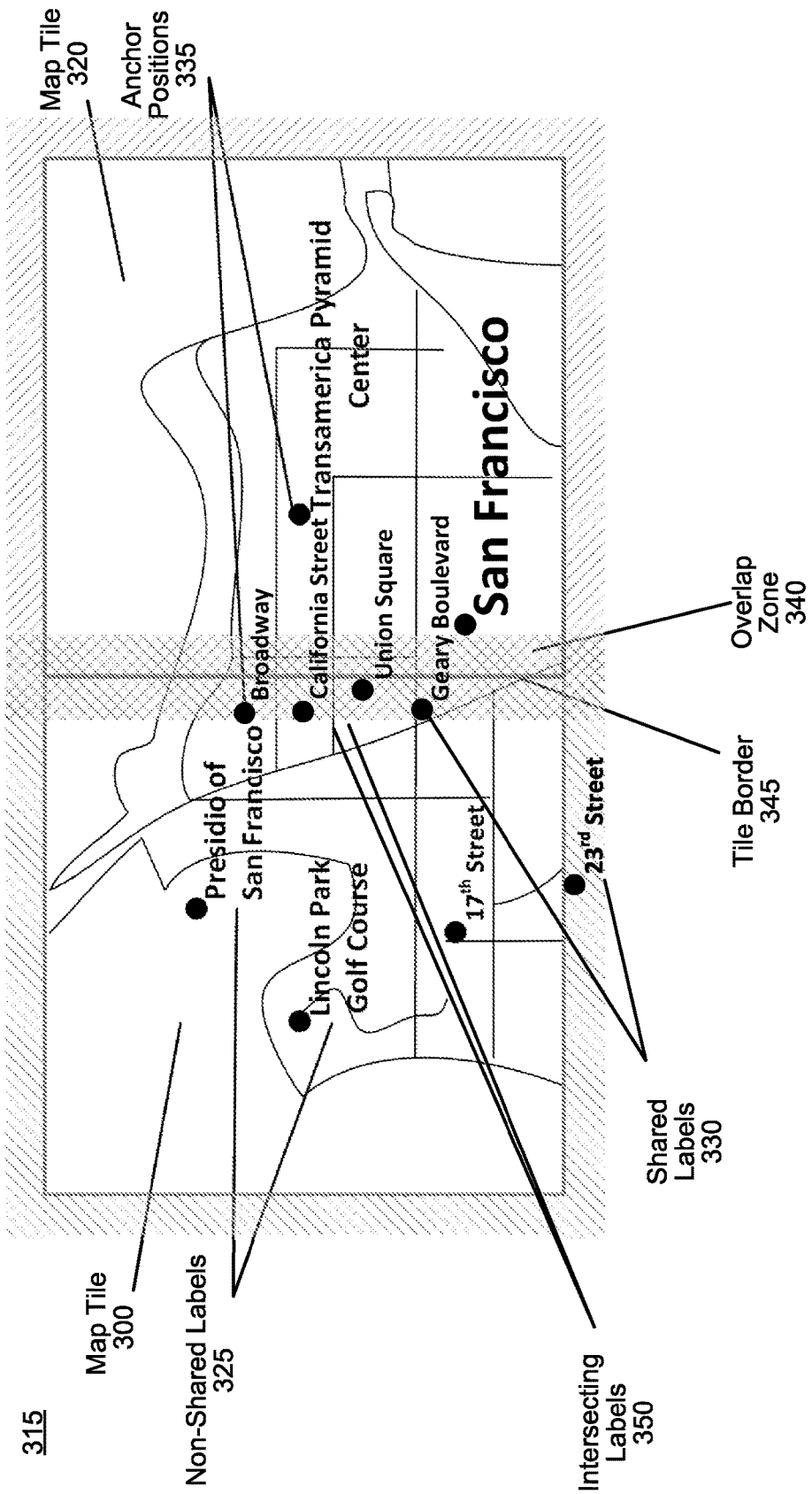
FIG. 3B illustrates a pair of adjacent map tiles rendered without mismatching label placement, according to one embodiment.

FIG. 3B illustrates an embodiment of a pair of adjacent map tiles 315 rendered without mismatching label placement. For instance, the pair of adjacent map tiles 315 may be provided to the client device 120 by mapping system 110 and rendered by stitching together the adjacent map tiles 315. In the embodiment shown, the adjacent map tiles 315 include the map tile 300 depicted in FIG. 3A on the left and another map tile 320 on the right. As described above with reference to FIG. 3A, both of the map tiles 300 and 320 have respective perimeter buffers and visible tile areas. The perimeter buffers of the map tiles 300 and 320 overlap the respective visible tile areas at the overlap zone 340, as indicated by the overlapping diagonal hash marks. Within the overlap zone 340 is a tile border where the visible tile areas of the map tile 300 and the map tile 315 meet, such as when the map tiles 300 and 320 are stitched together into an overall digital map. Although the perimeter buffers of the map tile 300 and 320 are depicted using diagonal hash marks with opposing orientations in FIG. 3B, this is done for the purposes of illustration (e.g., to differentiate the perimeter buffers of the map tiles 300 and 320). Within the perimeter buffer of the map tiles 300 and 315 are a set of shared labels 300 that correspond to multiple map tiles, such as the map tiles 300 and 320. Although not all of the shared labels 330 depicted in FIG. 3 are shared by the map tiles 300 and 320, such labels are still shared because they are within a perimeter buffer and can therefore overlap with other map tiles not depicted in FIG. 3, such as a label for "23$^{rd}$ Street" placed within the perimeter buffer of the map tile 300. Outside of the perimeter buffers are a set of non-shared labels 325, which are labels that correspond to anchor positions within the visible tile area of only a single map tile (i.e., only the map tile 300 or the map tile 320).

Each of the non-shared labels 325 and the shared labels 330 are placed with respect to one of the anchor positions 335, depicted as black dots in FIG. 3B. The non-shared labels 325 and the shared labels 330 are placed on the map tiles 300 and 320 (e.g., by the map tile rendering module 220) according to a set of label placement constraints. In the embodiment depicted in FIG. 3B and FIGS. 4A-D, labels are placed by applying the feature placement constraints to one or more offset positions relative to corresponding anchor positions (e.g., the anchor positions 335). The map tiles 300 and 320 may be associated with additional non-shared or shared labels that were not placed on the map tiles 300 and 320 during a label placement process (e.g., due to conflicting priorities or offset positions with the labels that were placed). As with the perimeter buffers, the anchor positions 335 are depicted in FIG. 3B as black dots for the purpose of illustration, and are not necessarily visible on the map tiles 300 and 320. The non-shared labels 325 and the shared labels 330 in FIG. 3B are depicted at offset positions down and to the right of the anchor positions 335 In this case, the labels may be positioned at the offset positions using a particular point on a bounding box defined around the label (e.g., according to bounding box width and height values), which are not depicted in FIG. 3B, In the case of FIG. 3B, the top-left corner of the bounding box for each label is used as the point placed at the offset position. In other contexts, the other points on the bounding boxes (e.g., the center, the left side, the right side, the top side, the bottom side, the top-right corner, the bottom-left corner, or the bottom-right corner) may be used to place a respective label at an offset position. Furthermore, the point on the bounding box may be adjustable. As described above with reference to the map tile rendering module 220, some or all of the labels of the map tiles 300 and 320 may be placeable at multiple offset positions, in which case one of the offset positions is selected for placing the respective labels on the map tiles 300 and 320.

The non-shared labels 325 and the shared labels 320 have placement priorities defined by the label placement constraints, which are indicated by the relative size of the labels in FIG. 3B. In particular, city names (e.g., "San Francisco) have the highest placement priority, points of interest (e.g., "Presidio of San Francisco") have a middle placement priority, and street names (e.g., "Broadway") have the lowest placement priority. These priorities are used for the purposes of illustration only, and the same or different types of labels may have different priorities in other embodiments.

The shared labels 330 include a set of intersecting labels 350 that intersect the tile border 345. Given the intersection with the tile border 345, the intersecting labels 350 are split between first and second portions rendered on the map tile 300 and the map tile 320. As depicted in FIG. 3B, the intersecting labels 350 specifically includes the label labels for "Broadway," "California Street," Union Square" and "Geary Boulevard." The intersecting labels 350 are placed the same offset positions on both the map tiles 300 and 320, and as such, the respective portions of the intersecting labels 350 on the map tiles 300 and 320 match up. However, through label placement processes of conventional systems, the intersecting labels 350 may be placed differently on the map tile 300 and the map tile 320, such as being placed at different offset positions or not placed at all, resulting in mismatching labels between the adjacent map tile 315. Examples of mismatching label placement of conventional systems, and a multi-phase label placement process that prevents such mismatching label placement, are described in greater detail below with reference to FIGS. 4A-D.

Figure 4A:
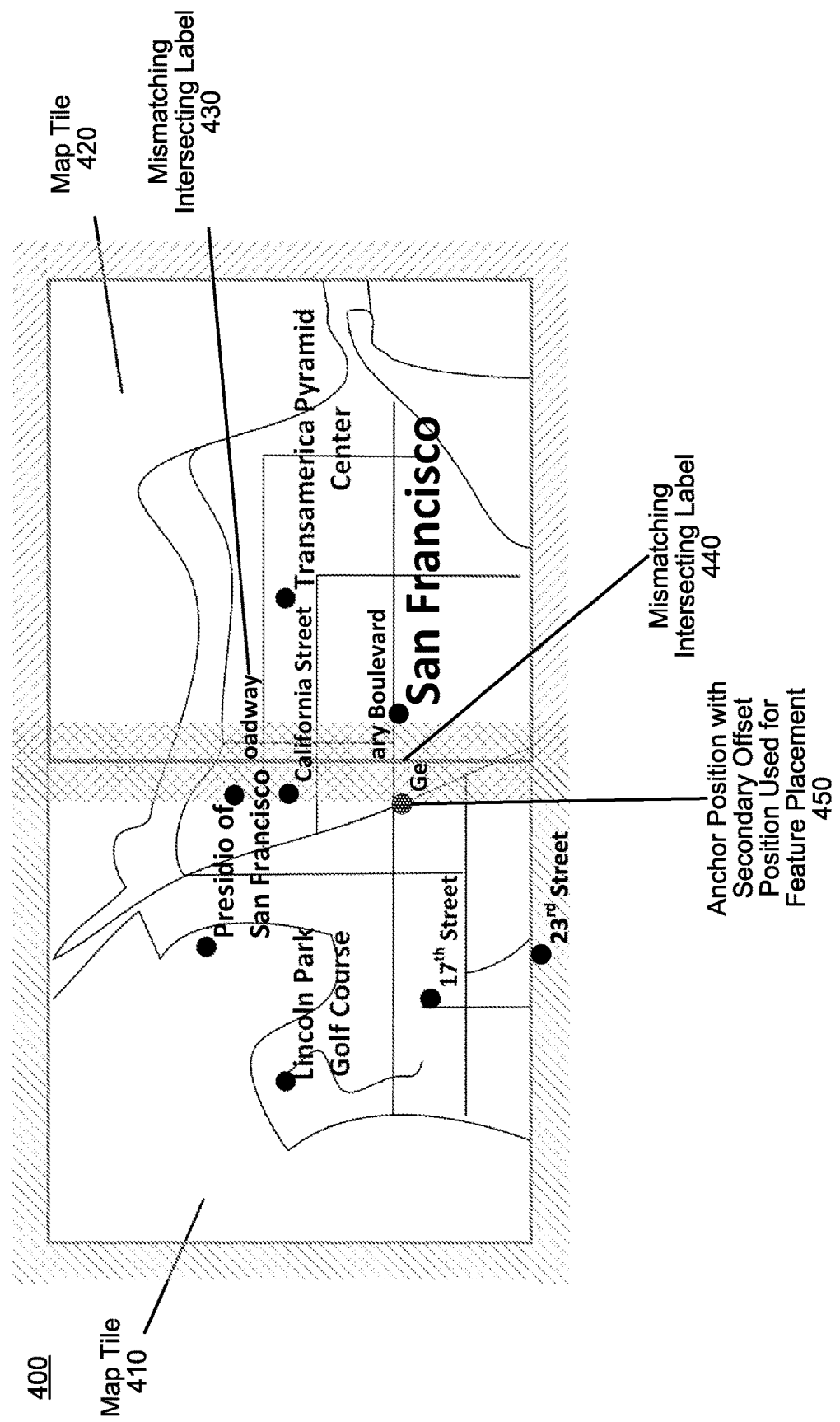
FIG. 4A illustrates a pair of adjacent map tiles rendered with mismatching label placement, according to one embodiment.

FIG. 4A illustrates an embodiment of a pair of adjacent map tiles 400 rendered with mismatching label placement. For instance, the pair of adjacent map tiles 400 may be rendered using map tiles rendered by a system using a conventional label placement process. In the embodiment shown, the adjacent map tiles 400 include a map tile 410 on the left and a map tile 420 on the right with similar characteristics as the map tiles 300 and 315 in FIG. 3. However, the placement of the labels has resulted in mismatching respective portions of the mismatching intersecting labels 430 and 440 on the map tile 410 and the map tile 420, which is now described in further detail The mismatching intersecting label 430 is a label for "Broadway" that was placed on the map tile 420 but was not placed on the map tiles 410, resulting in a portion of the "Broadway" label appearing on the map tile 420 but not the map tile 410. As an example, the mismatching placement of the "Broadway" label may be due to a conflict with a label for the "Presidio of San Francisco" when a set of label placement constraints were applied, leading to the "Broadway" label not being placed on the map tile 410 but still being placed on the map tile 420. The adjacent map tiles also include the mismatching intersecting label 440 for "Geary Boulevard" corresponding to multiple offset positions that is placed at a first offset position on the map tile 410 and placed at a second offset position on the map tile 420. In particular, the second offset position is up and to the right of an anchor position 450 of the mismatching intersecting feature 440, and the first offset position is down and to the right of the anchor position 450. As an example, the mismatching placement of the "Geary Boulevard" label may be due to a conflict with a label for "San Francisco" when a set of label placement constraints were applied. In order to illustrate the use of a secondary offset position relative to the anchor position 450 for placement of the mismatching intersecting feature 440, the anchor position 450 is represented in FIG. 4A using a dot pattern. In contrast, anchor positions for which labels are placed at a primary offset position are illustrated using solid black. Anchor positions for labels positioned at secondary offset positions are similarly represented in FIGS. 4B-D. In addition to mismatching placement of labels, a label for "Union Square" depicted in FIG. 3 is not placed on the adjacent map tiles 400. For instance, the "Union Square" label may not have been placed due to a conflict with the placement of the "San Francisco Label."

The placement of labels depicted in FIG. 3 is provided for the purposes of illustration only, and in other contexts or embodiments the adjacent map tiles 400 include other labels with other examples of mismatching label placement.

Figure 4B:
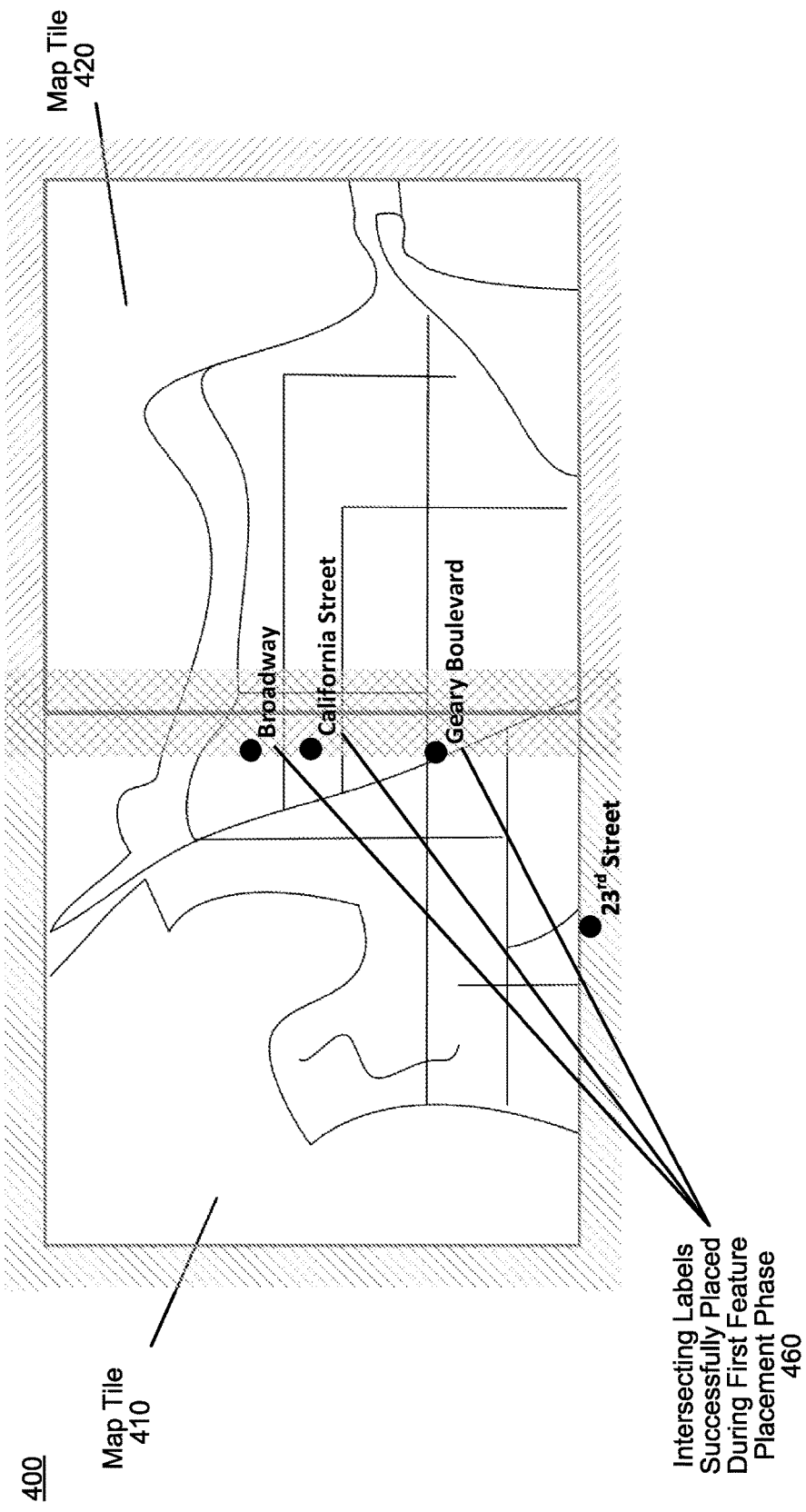
FIG. 4B illustrates placement of shared labels on adjacent map tiles during a first phase of a multi-phase label placement process, according to one embodiment.
Figure 4C:
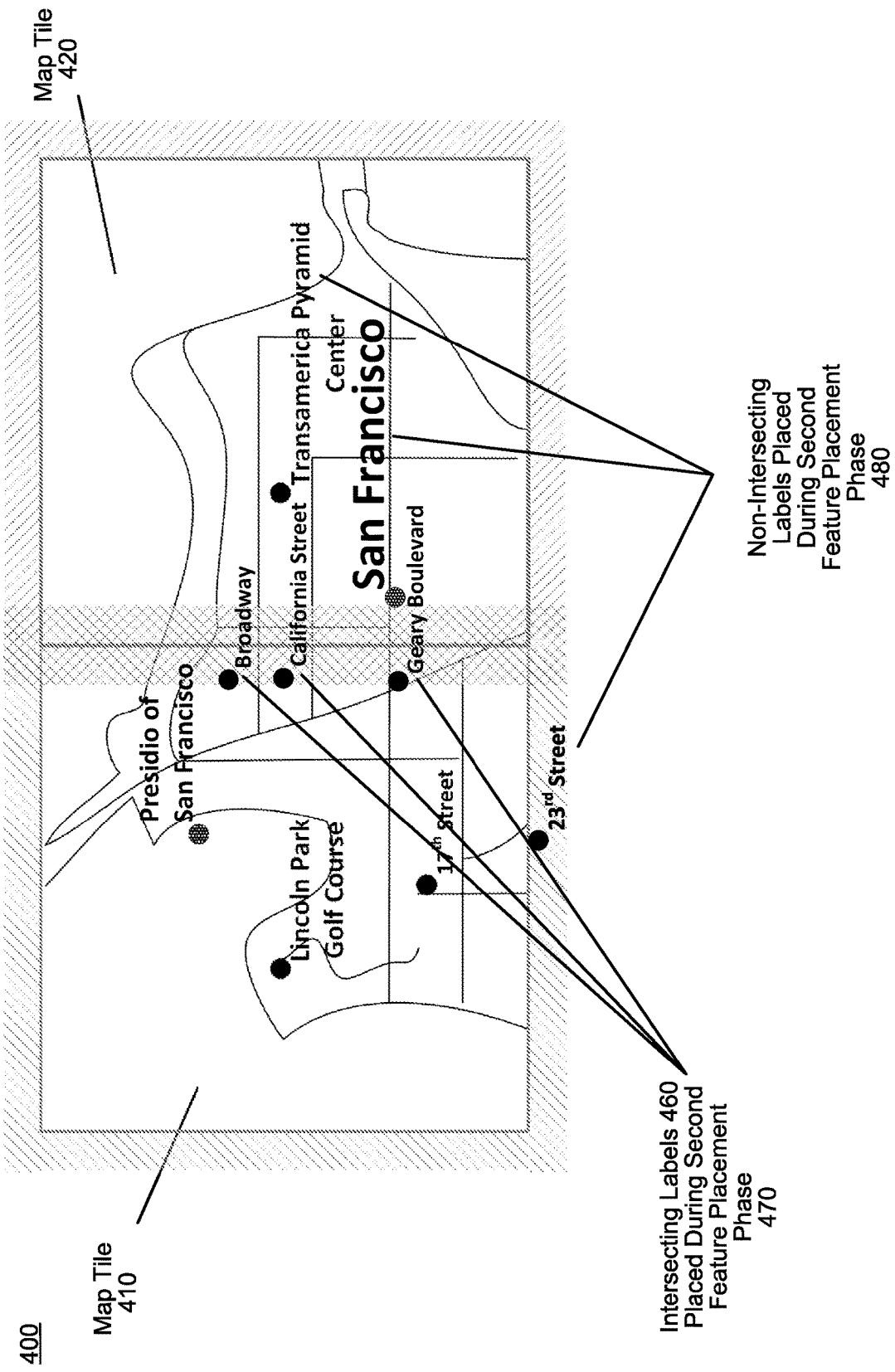
FIG. 4C illustrates placement of non-intersecting labels on adjacent map tiles during a second phase of a multi-phase label placement process, according to one embodiment.
Figure 4D:
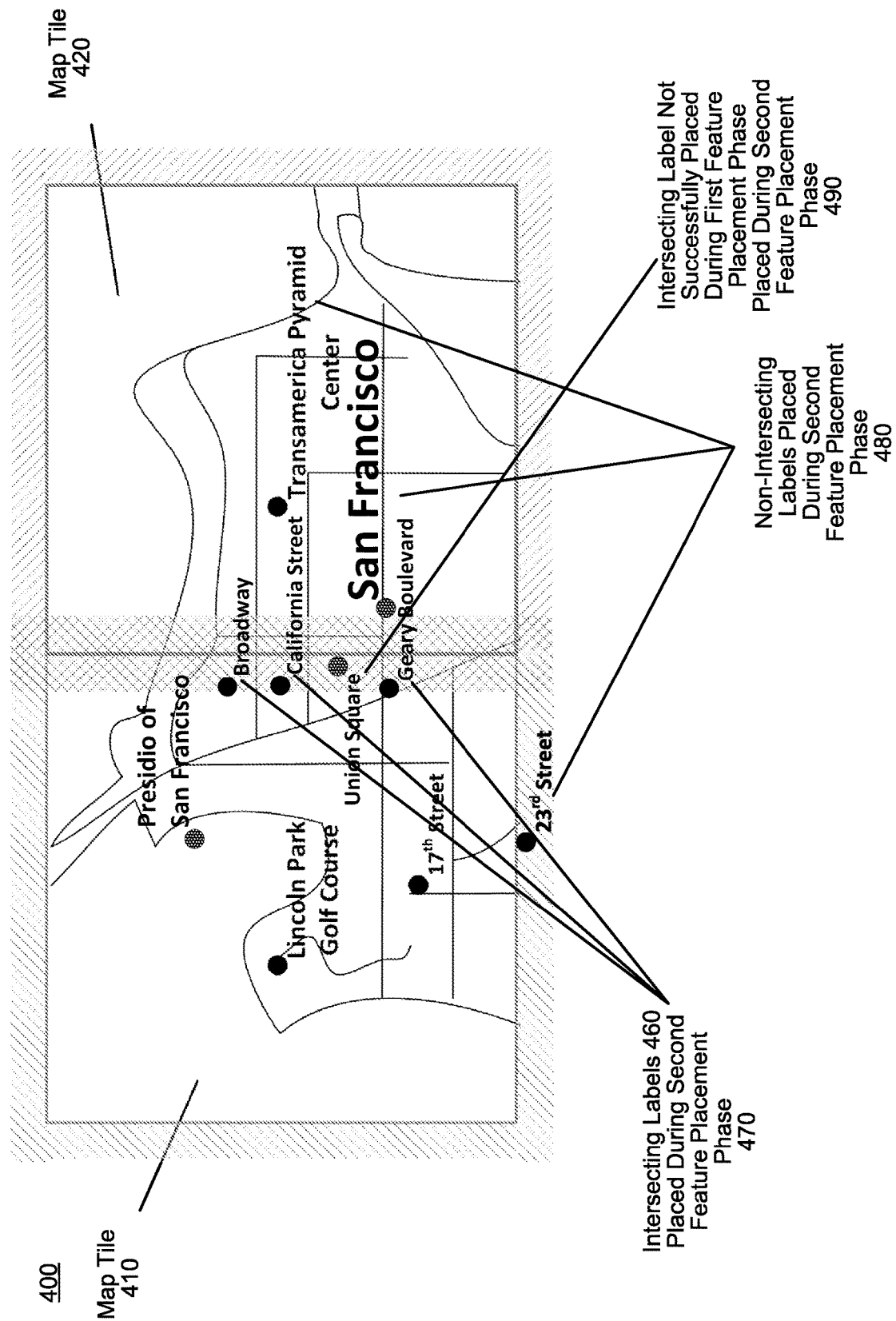
FIG. 4D illustrates placement of non-intersecting labels on adjacent map tiles during a second phase of a multi-phase label placement process, according to an embodiment.

FIGS. 4B-D illustrate steps of a multi-phase label placement process that prevents the mismatching label placement of the adjacent map tiles 400 depicted in FIG. 4A. As described herein, the multi-phase label placement process is performed by the mapping system 110 (e.g., by the map tile rendering module 220). In other embodiments, the multi-phase label placement process may be performed by other components or systems. Although FIGS. 4B-D describe the multi-phase label placement process in relation to two adjacent map tiles, this is done for the purposes of illustration only and is not meant to indicate that the multi-label placement process considers the two adjacent map tiles in parallel. In particular, the map tile rendering module 220 may perform the multi-phase label placement process using a single map tile without retrieving, processing, or otherwise using other map tiles (e.g., map tiles adjacent to the given map tile). Although the multi-phase label placement process may be performed using individual map tiles, the multi-phase label placement process ensures that the labels of adjacent map tiles are placed in the same manner and will therefore match (e.g., if the adjacent map tiles are stitched together).

FIG. 4B illustrates an embodiment of placement of shared labels on the adjacent map tiles 400 during a first phase of the multi-phase label placement process. In the embodiment shown, the mapping system 110 preliminarily places shared labels for the map tile 410 and the map tile 420, e.g., using a set of label placement constraints. In particular, the mapping system 110 places the shared labels using only a single offset position for each of the shared labels (e.g., a default offset position from a set of offset positions). As described above with reference to the map tile rendering module 220, the mapping system 110 may sort the shared labels before attempting to place the shared labels for the map tile 410 and 420 in order to ensure the shared labels are placed in the same order for both tiles. Based on the placement of the shared labels, the mapping system 110 identifies a set of intersecting labels 460 that have been successfully placed during the first label placement phase. The mapping system 110 may further identify a set of intersecting labels that were not successfully placed during the first labels placement phase, which is described in greater detail below with reference to FIG. 4D. Shared labels that do not intersect a tile border between the map tile 410 and the map tile 420 are not added to a set of labels or otherwise identified, such as the label for "23$^{rd}$ Street" depicted in FIG. 4B.

FIG. 4C illustrates an embodiment of placement of non-intersecting labels on the adjacent map tiles 400 during a second phase of the multi-phase label placement process. In the embodiment shown, the mapping system 110 clears the labels placed during the first label placement phase from the map tiles 410 and 420, such as by resetting or clearing various data structures maintained (e.g., by the map tile rendering module 220) to track placement of labels or label collisions (e.g., a collision index). After clearing the labels placed during the first label placement phase, the mapping system 110 places the set of intersecting labels 460 again during the second label placement phase. In particular, the mapping system 110 places the set of intersecting labels 460 in the same manner as during the first label placement phase. For instance, if the set of intersecting labels 460 are sorted (e.g., sorted during the first label placement phase, as described above), the mapping system 110 may place the set of intersecting labels 460 based on the ordering without applying a set of label placement constraints used during the first label placement phase. Alternatively, the mapping system 110 may reapply the label placement constraints to place the set of intersecting labels 460. After placing the set of labels 460, the mapping system 110 places a set of non-intersecting labels 480 during the second label placement phase according to a set of label placement constraints (e.g., the set of label placement constraints used during the first label placement phase). The set of non-intersecting labels 480 includes labels for the map tiles 410 and 420 that are not included in the set of intersecting labels 460, such as non-shared labels and shared labels that are not intersecting the tile border between the map tiles 410 and 420. If the mapping system 110 identifies a set of intersecting labels that were unsuccessfully placed during the first label placement phase, the mapping system 110 may ignore these intersecting labels when placing the set of non-intersecting labels 480.

In the example of FIG. 4C, the set of non-intersecting labels 480 include the non-shared label for the "Presidio of San Francisco" for map tile 410 and the non-shared label for "San Francisco" for the map tile 420. As depicted in FIG. 4C, these non-shared labels are placed at different (e.g., secondary) offset positions during the second label placement phase relative to the placement of the same labels in FIG. 4A. The differing placement of these labels is due to the placement of the set of intersecting labels 460 first. In particular, although these labels may have priorities that would result in displacement of labels in the set of intersecting labels 460 if placed in isolation (e.g., as in FIG. 4A), the mapping system 110 adjusts the placement of these labels by selecting a different offset position rather than displacing the labels from the set of intersecting labels 460. As such, the mapping system avoids the mismatching label placement depicted in FIG. 4A. In some embodiments, the mapping system 110 adjusts the size of the perimeter buffers of the map tiles 410 and 420 in order to avoid displacement of higher priority labels during the second label placement phase, as described above with reference to the map tile rendering module 220.

Figure 5:
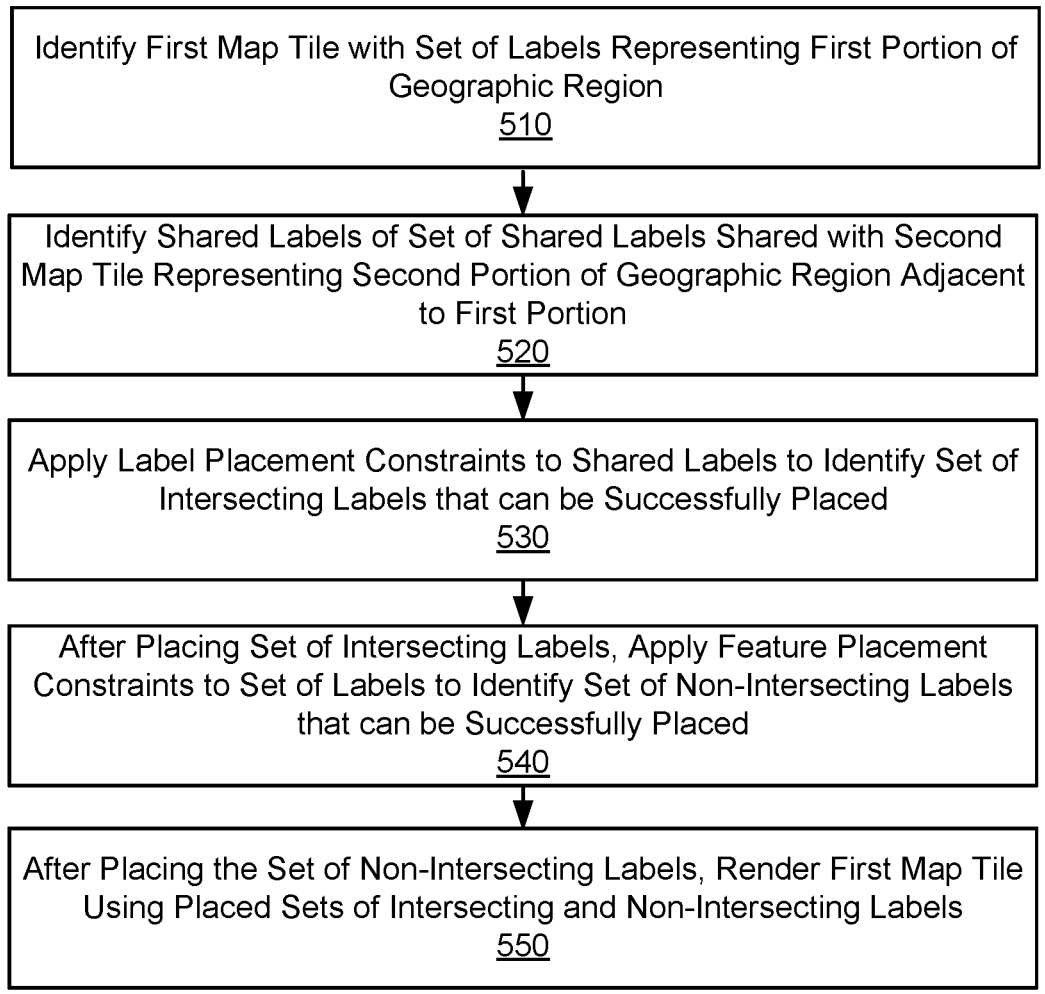
FIG. 5 is a flowchart illustrating a process for placing labels on a map tile, according to one embodiment.

FIG. 4D illustrates an embodiment of placement of non-intersecting labels on the adjacent map tiles 400 during the second phase of the multi-phase label placement process. In the embodiment shown, after placing the set of non-intersecting labels 480, the mapping system 110 attempts to place intersecting labels that could not be successfully placed during the first label placement phase. In particular, the mapping system 110 reattempts to place intersecting labels not successfully placed that correspond to multiple offset positions, such as by trying to place the labels at a different offset position than the one selected during the first label placement phase. As described above, the intersecting labels that were not successfully placed may be identified during the first label placement phase. As depicted in FIG. 4D, the mapping system 110 particularly places an intersecting label 490 for "Union Square" during the second label placement process that was not successfully placed during the first label placement process. As with the non-intersecting labels discussed above with reference to FIG. 4C, the mapping system 110 places the intersecting label 490 at a different offset position than the offset position selected during the first label placement phase that resulted in the intersecting label 490 not being placed. In particular, the intersecting label 490 is placed at an offset position down and to the left of the corresponding anchor position, such that it is no longer an intersecting label. FIG. 5 is a flowchart illustrating an embodiment of a process 500 for placing labels on a map tile. In the embodiment shown, the steps of FIG. 5 are illustrated from the perspective of the mapping system 110. In other embodiments, some or all of the steps may be performed by other entities or components. In addition, some embodiments may perform the steps in parallel, perform the steps in different orders, or perform different steps.

In the embodiment shown in FIG. 5, the process 500 begins with the mapping system 110 identifying 510 a first map tile with a set of labels that include one or more shared labels. In particular, the map tile represents a first portion of a geographic region, such as a geographic region for which a rendered digital map was requested (e.g., by the client device 120). The mapping system 110 identifies 520 one or more shared labels of the set of labels that are shared with a second map tile, where the second map tile represents a second portion of the geographic region adjacent to the first portion. For instance, the first and second map tiles may be adjacent map tiles (e.g., the adjacent map tiles 315 or 400, as described above) with overlapping perimeter buffers. In this case, the one or more shared labels correspond to anchor positions within an overlapping zone of the overlapping perimeter buffers (e.g., the overlap zone 340). The first map tile may further have any number of non-shared labels.

The mapping system 110 applies 530 label placement constraints to the one or more shared labels in order to identify a set of intersecting labels that can be successfully placed on the first map tile. In particular, the intersecting labels intersect a tile border of the first map tile, where the tile border is within an overlap zone of the first map tile and the second map tile For instance, the mapping system 110 may perform a first label placement phase of a multi-phase label placement process, as described above, e.g., with reference to FIG. 4B.

After placing the set of intersecting labels on the first map tile, the mapping system 110 applies 540 the label placement constraints to the set of labels to identify a set of non-intersecting labels that can be successfully placed on the first map tile. For instance, the mapping system 110 may perform a second phase of a multi-phase label placement process, as described above, e.g., with reference to FIG. 4C. In particular, the applying 540 takes into account the already placed set of intersecting labels when determining whether labels of the set of labels can be placed on the first map tile. As such, the set of intersecting labels are placed on the first map tile such that they will match with placement of the set of intersecting labels on the second map tile if stitched together.

After placing the set of non-intersecting labels (e.g., on the first map tile), the mapping system renders 550 the first map tile using the places sets of intersecting labels and non-intersecting labels. For instance, the mapping system 110 may render the first map tile as an image including geometric information and placed labels. The mapping system may further provide the rendered first map tile to another system (e.g., the client device 120) for stitching together with a render of the second map tile to generate an overall digital map. The overall digital map may be displayed on an interface, e.g., of the client device 120. The digital map may further include additional rendered map tiles.

As such, through process 500, or other processes described herein, the mapping system 110 provides for rendering of digital maps without mismatching labels between adjacent rendered map tiles included in the digital maps. In particular, the mapping system 110 first identifies labels of a map tile intersecting adjacent map tiles that can be successfully placed and places those labels on the map tile before considering other labels. This is in contrast to conventional techniques that place labels for a map tile without considering shared labels, resulting in mismatching labels between adjacent map tiles.

V. Computer Diagram

Figure 6:
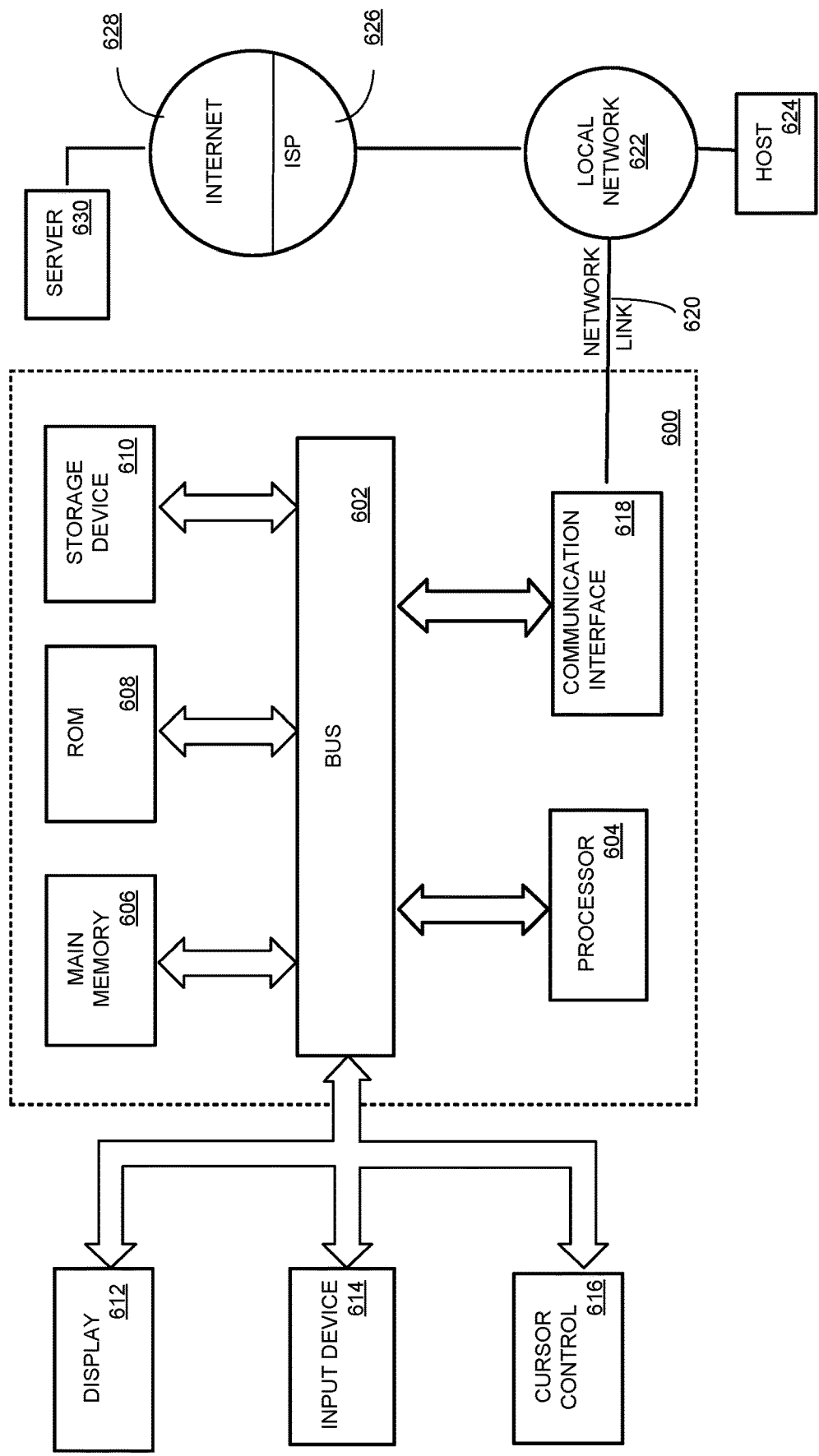
FIG. 6 is a block diagram that illustrates a computer system upon which embodiments of components of the computing environment depicted in FIG. 1 may be implemented, according to an embodiment.

FIG. 6 is a block diagram that illustrates a computer system 600 upon which embodiments of components of the computing environment 100 may be implemented. Computer system 600 includes a bus 602 or other communication mechanism for communicating information, and a hardware processor 604 coupled with bus 602 for processing information. Hardware processor 604 may be, for example, a general purpose microprocessor.

Example computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a LCD screen, LED screen, or touch screen, for displaying information to a computer user. An input device 614, which may include alphanumeric and other keys, buttons, a mouse, a touchscreen, or other input elements is coupled to bus 602 for communicating information and command selections to processor 604. In some embodiments, the computer system 600 may also include a cursor control 616, such as a mouse, a trackball, or cursor direction keys for communicating direction information and command selections to processor 604 and for controlling cursor movement on display 612. The cursor control 616 typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and stored in storage device 610, or other non-volatile storage for later execution.

VI. Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, any reference to "one embodiment" or "an embodiment" means that a particular element, label, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying a first map tile representing a first portion of a geographic region, the first map tile associated with a set of labels that correspond to map features;
    identifying one or more shared labels in the set of labels, wherein each shared label of the one or more shared labels is included in both the set of labels of the first map tile and a second set of labels of a second map tile representing a second portion of the geographic region adjacent to the first portion;
    applying label placement constraints to the one or more shared labels to identify a set of intersecting labels that can be successfully placed on the first map tile, wherein the intersecting labels intersect a tile border of the first map tile and the second map tile;
    after placing the set of intersecting labels on the first map tile, applying the label placement constraints to the set of labels to identify a set of non-intersecting labels that can be successfully placed on the first map tile without overlapping labels of the set of intersecting labels; and
    after placing the set of non-intersecting labels on the first map tile, rendering the first map tile using the placed sets of intersecting labels and non-intersecting labels.

2. The method of claim 1, further comprising:
    identifying, based on the applying, an additional set of intersecting labels that cannot be successfully placed;
    after placing the set of non-intersecting labels on the first map tile, reapplying the label placement constraints to the additional set of intersecting labels to identify an additional set of intersecting labels that can be successfully placed on the first map tile; and
    before rendering the digital map, placing the additional set of intersecting labels on the first map tile.

3. The method of claim 2, wherein the additional set of intersecting labels includes an intersecting label corresponding to a plurality of offset positions on the first map tile relative to an anchor position, and wherein reapplying the label placement constraints to the additional set of intersecting labels comprises:
    selecting an offset position from the plurality of offset positions, the selected offset position distinct from an additional offset position used to apply the label placement constraints; and
    reapplying the label placement constraints to the intersecting label using the selected offset position.

4. The method of claim 1, wherein the first and second map tiles have respective first and second perimeter buffers, and the one or more shared labels each correspond to a respective anchor position in the first and second perimeter buffers.

5. The method of claim 4, further comprising:
    responsive to placement of a non-shared label of the set of labels being displaced by placement of an intersecting label of the set of intersecting labels, increasing a size of the first perimeter buffer.

6. The method of claim 1, wherein a shared label of the one or more shared labels corresponds to a plurality of offset positions relative to an anchor position on the first or second map tile, and wherein applying label placement constraints to the one or more shared labels comprises:
    selecting an offset position from the plurality of offset positions; and
    applying the label placement constraints to the shared label using the selected offset position.

7. The method of claim 1, wherein applying the label placement constraints to the one or more shared labels comprises:
    sorting the one or more shared labels based on placement priorities of the one or more shared labels; and
    placing the one or more shared labels on the first map tile according to the sorting.

8. The method of claim 1, wherein each label in the set of labels corresponds to a placement priority and an anchor position, and wherein applying the label placement constraints comprises:
    for each shared label of the one or more shared labels:
        determining an offset position relative to the anchor position of the shared label;
        determining, using the label placement constraints, whether the offset position and placement priority of the shared label conflict with one or more other labels placed on the first map tile; and
        responsive to determining the offset position and placement priority of the shared label do not conflict, placing the shared label on the first map tile at the offset position.

9. The method of claim 8, wherein applying the label placement constraints further comprises:
   maintaining a collision index describing placement conflicts of the one or more shared labels; and
   before placing the set of intersecting labels on the first map tile, clearing the collision index and removing placed labels of the one or more shared labels.

10. The method of claim 8, wherein the placement priorities of the set of labels correspond to a type of label the set of labels represent.

11. The method of claim 1, further comprising:
   providing the rendered first map tile to a client device for stitching together with a render of the second map tile to generate a digital map for display on the client device.

12. The method of claim 1, wherein each label of the set of labels corresponds to a placement priority and an anchor position, and wherein applying the label placement constraints comprises:
   for each shared label of the one or more shared labels:
      determining an offset position relative to the anchor position of the shared label;
      determining, using the label placement constraints, whether the offset position and placement priority of the shared label conflict with one or more other labels placed on the first map tile; and
      responsive to determining the offset position and placement priority of the shared label do conflict, refraining from placing the shared label on the first map tile.

13. A non-transitory computer-readable storage medium comprising instructions that, when executed by a computer processor, cause the processor to perform operations comprising:
   identifying a first map tile representing a first portion of a geographic region, the first map tile associated with a set of labels that correspond to map features;
   identifying one or more shared labels in the set of labels, wherein each shared label of the one or more shared labels is included in both the set of labels of the first map tile and a second set of labels of a second map tile representing a second portion of the geographic region adjacent to the first portion;
   applying label placement constraints to the one or more shared labels to identify a set of intersecting labels that can be successfully placed on the first map tile, wherein the intersecting labels intersect a tile border of the first map tile and the second map tile;
   after placing the set of intersecting labels on the first map tile, applying the label placement constraints to the set of labels to identify a set of non-intersecting labels that can be successfully placed on the first map tile without overlapping labels of the set of intersecting labels; and
   after placing the set of non-intersecting labels on the first map tile, rendering the first map tile using the placed sets of intersecting labels and non-intersecting labels.

14. The computer-readable storage medium of claim 13, further comprising:
   identifying, based on the applying, an additional set of intersecting labels that cannot be successfully placed;
   after placing the set of non-intersecting labels on the first map tile, reapplying the label placement constraints to the additional set of intersecting labels to identify an additional set of intersecting labels that can be successfully placed on the first map tile; and
   before rendering the digital map, placing the additional set of intersecting labels on the first map tile.

15. The computer-readable storage medium of claim 14, wherein the additional set of intersecting labels includes an intersecting label corresponding to a plurality of offset positions on the first map tile relative to an anchor position, and wherein reapplying the label placement constraints to the additional set of intersecting labels comprises:
   selecting an offset position from the plurality of offset positions, the selected offset position distinct from an additional offset position used to apply the label placement constraints; and
   reapplying the label placement constraints to the intersecting label using the selected offset position.

16. The computer-readable storage medium of claim 13, wherein the first and second map tiles have respective first and second perimeter buffers, and the one or more shared labels each correspond to a respective anchor position in the first and second perimeter buffers.

17. The computer-readable storage medium of claim 16, the operations further comprising:
   responsive to placement of a non-shared label of the set of labels being displaced by placement of an intersecting label of the set of intersecting labels, increasing a size of the first perimeter buffer.

18. The computer-readable storage medium of claim 13, wherein a shared label of the one or more shared labels corresponds to a plurality of offset positions relative to an anchor position on the first or second map tile, and wherein applying label placement constraints to the one or more shared labels comprises:
   selecting an offset position from the plurality of offset positions; and
   applying the label placement constraints to the shared label using the selected offset position.

19. The computer-readable storage medium of claim 13, wherein applying the label placement constraints to the one or more shared labels comprises:
   sorting the one or more shared labels based on placement priorities of the one or more shared labels; and
   placing the one or more shared labels on the first map tile according to the sorting.

20. The computer-readable storage medium of claim 13, wherein each label in the set of labels corresponds to a placement priority and an anchor position, and wherein applying the label placement constraints comprises:
   for each shared label of the one or more shared labels:
      determining an offset position relative to the anchor position of the shared label;
      determining, using the label placement constraints, whether the offset position and placement priority of the shared label conflict with one or more other labels placed on the first map tile; and
      responsive to determining the offset position and placement priority of the shared label do not conflict, placing the shared label on the first map tile at the offset position.

* * * * *